April 18, 1944.   S. BERGMAN   2,346,895
VEHICLE SEAT
Filed May 2, 1942   3 Sheets-Sheet 1
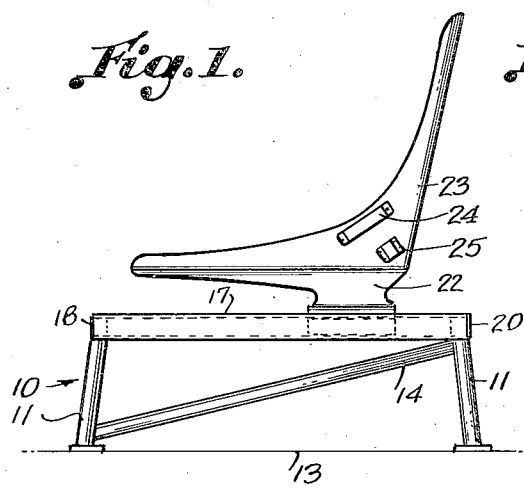
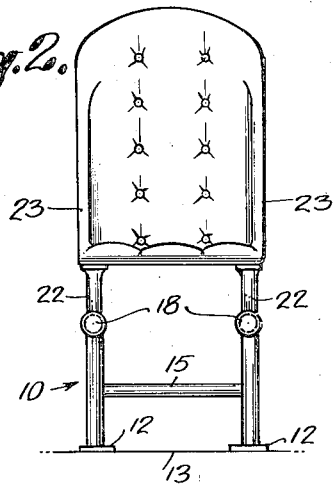
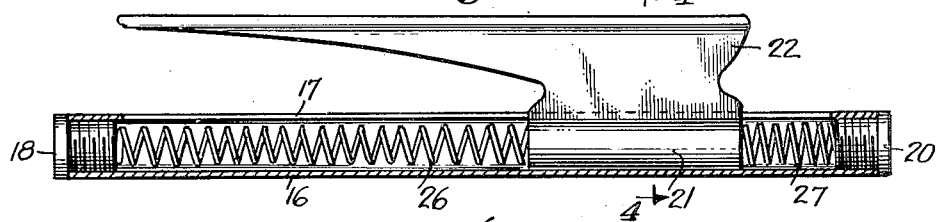
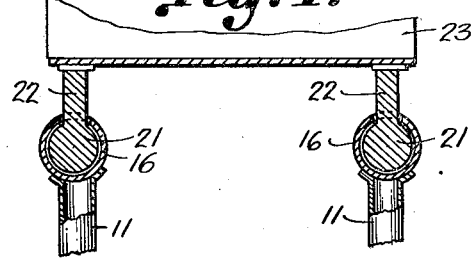
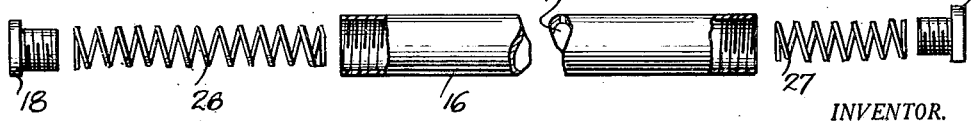
INVENTOR.
SIMON BERGMAN.
BY Miller & Miller.
ATTORNEYS.

April 18, 1944.  S. BERGMAN  2,346,895
VEHICLE SEAT
Filed May 2, 1942  3 Sheets-Sheet 2
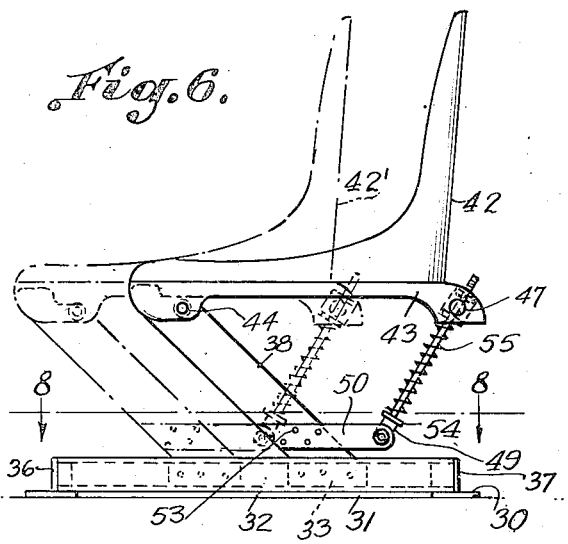
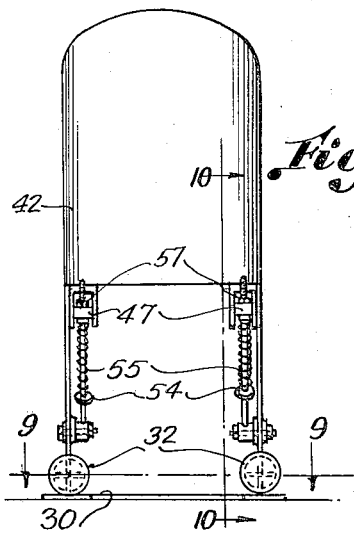
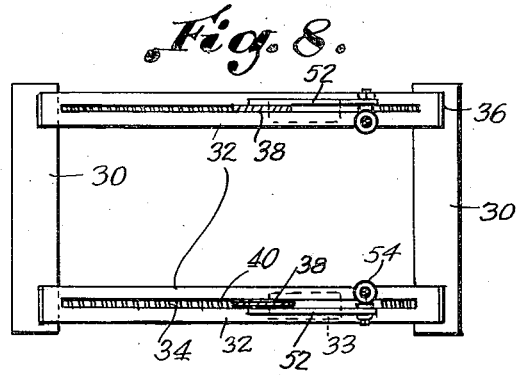
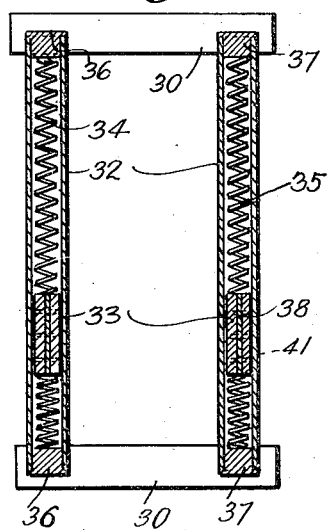
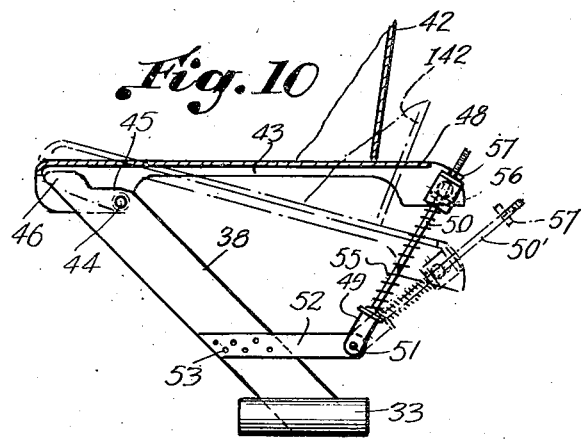
INVENTOR.
SIMON BERGMAN.
BY Miller & Miller.
ATTORNEYS.

April 18, 1944. S. BERGMAN 2,346,895
VEHICLE SEAT
Filed May 2, 1942 3 Sheets-Sheet 3
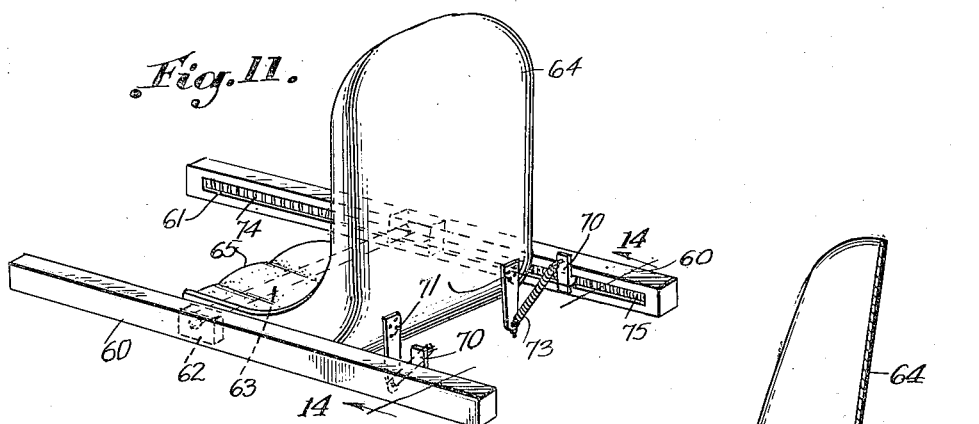
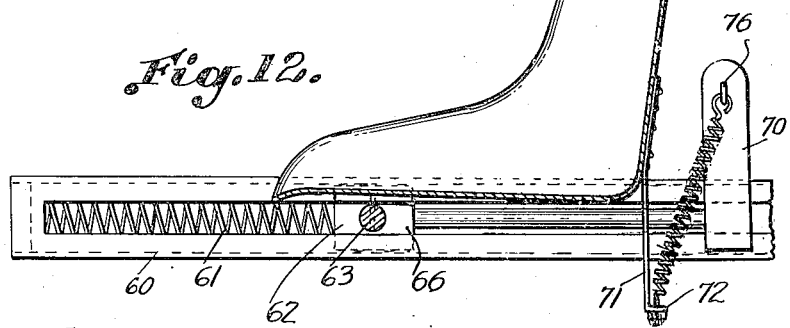
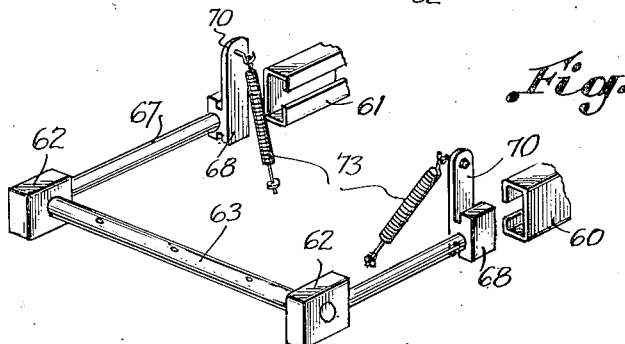
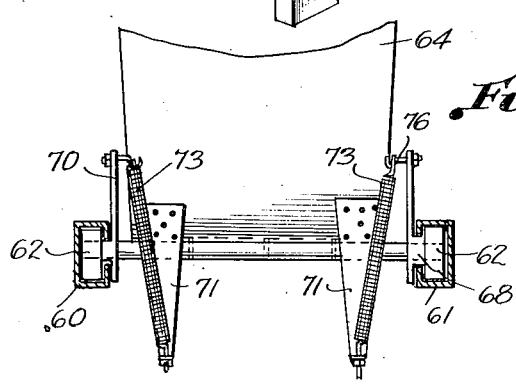
INVENTOR.
SIMON BERGMAN.
BY Miller & Miller.
ATTORNEYS.

Patented Apr. 18, 1944

2,346,895

UNITED STATES PATENT OFFICE 2,346,895

VEHICLE SEAT

Simon Bergman, New York, N. Y.

Application May 2, 1942, Serial No. 441,471

4 Claims. (Cl. 155—9)

This invention relates to a vehicle seat and has for an object to provide a seat construction that is of a shock-absorbing nature, particularly useful on airplanes, but similarly useful on other vehicles.

A further object of this invention is to provide a vehicle seat for use on airplanes that is of such a nature that it will cushion the occupant against a great part of the shock present when the airplane is coming out of a dive, but also serves to absorb the shock in case the airplane or other vehicle is in a crash.

A further object of this invention is to provide a vehicle seat capable of so absorbing the shock of an airplane dive that it will tend to prevent the pilot from "blacking out" at the termination of a dive or will also enable the pilot to come out of dives of greater velocity with less danger of "blacking out" or becoming momentarily unconscious under the terrific centrifugal force created by such diving, as in dive bombing or emergency landings.

A further object of the invention is to provide a vehicle seat construction which serves to transmit the shock of rapid deceleration, as in the termination of a dive or in the event of a crash of the airplane or vehicle, so gradually to the occupant that he will not tend to lose consciousness or be injured through the sudden deceleration of the vehicle.

Still a further object of this invention is to apply the same principle to several forms of seat construction.

With the foregoing and other objects in view, this invention includes the combination, construction and arrangement of parts hereinafter disclosed, set forth, claimed and illustrated on the accompanying drawings, wherein:

Fig. 1 is a side elevational view of one form of seat construction;

Fig. 2 is a front view of the seat of Fig. 1;

Fig. 3 is a partly sectional, partly elevational view of the shock-absorbing mechanism;

Fig. 4 is a sectional view partly broken away on line 4—4 of Fig. 3;

Fig. 5 is an exploded partly broken away view of the shock-absorbing mechanism;

Fig. 6 is a side elevational view of another form of the vehicle seat of this invention;

Fig. 7 is a back view of Fig. 6;

Fig. 8 is a sectional view on line 8—8 of Fig. 6;

Figs. 9 and 10 are sectional views on lines 9—9 and 10—10 of Fig. 7;

Fig. 11 is a perspective view of still another form of the vehicle seat of this invention;

Fig. 12 is a sectional view longitudinally of Fig. 11;

Fig. 13 is a detail view of part of the shock-absorbing mechanism; and

Fig. 14 is a sectional view on line 14—14 of Fig. 11;

The invention is shown as applied to three different types of seats, the first form in Figs. 1 to 5 being of the type for use in transport aircraft, but equally applicable to an automobile or other land or water vehicle. The second form, shown in Figs. 6 to 10, is particularly adaptable for use in aircraft of the type used in dive bombing or other aerial acrobatics; while the third form shown in Fig. 11 is intended for use in dive bombing aircraft which are extremely narrow so that the seat is to be supported on the side walls of the fuselage rather than on the floor of the fuselage.

Now referring to the first or transport form shown in Figs. 1 to 5, there is shown at 10 a stand or framework including legs 11 adapted to be supported on feet 12 resting on the floor 13 of the aircraft or other vehicle, the frame 10 also including angular braces 14 and cross-braces 15, all of which may be made of lightweight tubing properly welded together.

At the top of the legs 11 and extending between the front and rear pair, there are provided a pair of cylinder tubes 16, each provided with a longitudinal slot 17 at the top thereof. Each of the ends of the tubes 16 is threaded to receive closer-plugs 18 and 20.

Slidable within the tube 16 is a solid piston 21 from which extends a frame 22 which provides a support for the cushioned seat 23, the seat 23 being also provided with suitable belt fittings 24 and 25 as customary in airplane seats.

The slot 17 and tube 16 are of such width that the frame 22 may extend freely therethrough, while the piston 21 is confined within the cylinder tube 16.

A main shock-absorbing spring 26 is inserted in the tube 16 between the front plug 18 and piston 21 while a shorter recoil spring 27 is inserted between the rear plug 20 and the back of the piston 21.

The piston 21 will be suitably lubricated so that it may slide freely within the cylinder tube 16 when necessary.

In operation, this transport type of seat supports the occupant in its padded seat 23, as customary. When, however, the vehicle suddenly decelerates, as in coming in for a landing or in the event of a crash, the seat 23 slides forwardly on its pistons 21 against the shock-absorbing spring 26, gradually slowing up the occupant and preventing him from being injured by this sudden deceleration.

When the seat has come to a stop, the compressed spring 26 naturally returns the seat back toward its original position and the recoil spring 27 absorbs this recoil of the seat, so as to prevent the recoil of the seat from likewise causing any injury.

Although a shock-absorbing coil spring has been disclosed, it is obvious that any other suitable shock-absorbing, yielding means may be substituted for the coil springs.

In the form of the invention shown in Figs. 6 to 10 inclusive, the feet 30 resting on the aircraft floor 31 support two spaced cylindrical tubes 32 substantially identical in construction with the tube 16. Each of these tubes 32 contains a seat supporting piston 33 and shock-absorbing spring 34 and recoil spring 35 held in position by a forward plug 36 and a rear plug 37, suitable lubrication being provided as needed.

In this form, the piston 33 is shown as being made of two piston halves secured together about seat supporting legs 38 firmly secured therebetween and extending at an upward angle therefrom through the slot 40 provided in each cylinder tube 32.

As shown in Fig. 9, the leg 38 is secured between the piston halves by means of pins 41, but it will be obvious that they may be welded thereto or otherwise firmly secured.

The cushion seat 42 is provided with a pair of depending U-shaped channel members 43 extending from the front to the rear thereof on opposite sides thereof.

The upper end of each leg 38 is pivoted as at 44 to the forward end of the channel member 43, the pivot 44 being so placed in the channel member 43 and the upper end of the leg 38 being so cut away, as at 45, that it is possible for the rear of the seat 42 to pivot downwardly about the forward pivot 44 as a center, while the toe 46 of leg 38 serves to prevent pivoting beyond a horizontal position in the opposite direction.

The rear of the seat 42 is supported by a clevis pin 47 extending across the channel member 43 at the end thereof, the bight of the channel stopping short of its point as at 48. Extending through the clevis pin 47 is a rod 50, whose other end is flattened as at 49 and pivoted as at 51 to a support formed by a plate 52 riveted or welded as at 53 to the leg 38.

If increased strength is needed, additional similar plates 52 may be riveted to the opposite side of leg 38 and secured thereto.

A washer 54 placed above the flattened end 49 of rod 50 provides a stop or base for a coil spring 55 placed about the rod 50, a second stop 56 being placed above the spring 55 below the clevis pin 47. Above the clevis pin 47 the upper end of the rod 50 is threaded to receive a nut 57 for adjusting the seat 42 to the proper angle.

In operation in this form, in case of a sudden deceleration without changing the angle of flight, the seat 42 will move to the position shown at 42' in Fig. 6 against the action of the coil springs 34 in a manner identical to that shown in the forms of Figs. 1 to 5 inclusive, the spring 35 taking up the recoil.

In changing the angle of flight, as in coming out of a dive, the springs 55 will be compressed and the seat will approach the position shown at 142 shown in Fig. 10, with the rod 50 moved into position 50' as it turns about its pivot 51 and slides through the clevis pin 47. Generally, however, the seat will partake of both these motions simultaneously in more or less degree when the aircraft comes out of a dive, thus permitting the body of the occupant to be cushioned in both directions and assuming a position in which he is much less likely to "black out" or become unconscious under the centrifugal force caused by aerial maneuvers.

The form shown in Figs. 11 to 14 operates the same as the form shown in Figs. 6 to 10 but is intended for aircraft that is so narrow that the seat is preferably supported on the side walls of the fuselage, although the constructional details are slightly different, as will now be brought out.

In this form, the cylinder tubes 60, instead of being circular, are rectangular in cross-section, and have their slots 61 provided on the inner sides facing each other instead of on top. Slidable within these rectangular cylinders 60 are a pair of rectangular pistons 62, secured together by a cross-rod 63. The seat 64 is supported and pivoted at its front or leading edge 65 on this cross-rod 63, suitable depending flanges 66 being provided on the bottom of the seat 64 through which the cross-rod 63 extends.

Extending within each rectangular cylinder 60 is a connecting rod 67 to which is connected a second rectangular piston 68, each of which is provided with an upstanding arm 70 outside of the rectangular piston 60. At the back of the seat 64 adjacent each side, there is provided depending legs 71, each ending in an apertured toe 72. A coil spring 73 of suitable strength has one end secured to the opposite toe 72 of the seat leg 71, while its other end is fastened to a hook 76 supported at the top end of the upstanding arm 70.

As will be apparent, a main shock-absorbing spring 74 is provided in each rectangular cylinder 60 between the piston 62 and the front end of the cylinder 60, while a recoil spring 75 is provided behind the piston 68 and the rear of the tube 60.

In operation, this seat partakes of the same motions and actions as does the form in Figs. 6 to 10 inclusive, it being apparent from Fig. 14 that the seat 64 may pivot downwardly between the pistons 60 against the action of the extension coil springs 73.

While the preferred construction and arrangement of parts has hereinbefore been set forth and disclosed, it will be understood that this invention is not to be considered as limited to the details shown or described, but that the invention is only within the scope of what is hereinafter claimed.

Having thus set forth and disclosed the nature of this invention, what is claimed is:

1. Means for yieldably supporting a vehicle seat whose plane is normally substantially horizontal, said means comprising a piston, means for mounting the seat on said piston, a cylinder substantially parallel to the plane of said seat in which said piston is longitudinally movable, and yieldable means permitting limited horizontal movement of said piston and tending to restore said piston to its original position, said mounting means for the seat being pivotally connected to the seat at the forward end of the seat, and yieldable means connecting the rear of the seat to said piston, permitting said seat to pivot a limited but substantial amount about said forward mounting means.

2. Means for yieldably supporting a vehicle seat comprising a piston, means for mounting the seat on said piston, a cylinder in which said piston is longitudinally movable, yieldable means permitting limited movement of said piston and tending to restore said piston to its original position, said mounting means for the seat being pivotally connected to the seat at the forward end of the seat, yieldable means connecting the rear of the seat to said piston, permitting said seat to pivot a limited amount about said forward mounting means, said seat pivoting means including a member supported on said piston, a rod pivoted at one end to said member, means for slidably securing the other end of said rod to the rear of said seat, and a compression spring between said supporting member and the rear of the seat.

3. Means for yieldably supporting a vehicle seat comprising a piston, means for mounting the seat on said piston, a cylinder in which said piston is longitudinally movable, and yieldable means permitting limited movement of said piston and tending to restore said piston to its original position, said mounting means for the seat being pivotally connected to the seat at the forward end of the seat, yieldable means connecting the rear of the seat to said piston, permitting said seat to pivot a limited amount about said forward mounting means, said seat pivoting means including a member supported on said piston, a leg depending from the rear of the seat, and an extension coil spring secured between said piston supported member and said rear seat leg.

4. Means for yieldably supporting a dive bomber seat comprising a piston, means for mounting the seat on said piston, a cylinder in which said piston is longitudinally movable, the axis of said cylinder being substantially parallel to the plane of said seat, and yieldable means permitting limited movement of said piston and tending to restore said piston to its original position, said mounting means for the seat being pivotally connected to the seat at the forward end thereof, and yieldable means connecting the rear of the seat to said piston permitting the seat to pivot a limited amount about said forward mounting means, said latter yieldable means including a coil spring secured between said piston and the rear of the seat whereby said dive bomber seat can move parallel to its plane and simultaneously the rear of said seat can pivot downwardly at an angle to its plane under the pressure of rapid changes in acceleration.

SIMON BERGMAN.